US008650659B2

(12) United States Patent
Capasso et al.

(10) Patent No.: US 8,650,659 B2
(45) Date of Patent: Feb. 11, 2014

(54) METHOD AND APPARATUS FOR SECURING MEDIA ASSET DISTRIBUTION FOR A MARKETING PROCESS

(75) Inventors: Ralph Anthony Capasso, Hoboken, NJ (US); Robert James Dewilder, New York, NY (US)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 13/038,837

(22) Filed: Mar. 2, 2011

(65) Prior Publication Data

US 2012/0227112 A1 Sep. 6, 2012

(51) Int. Cl.
*G06F 21/00* (2013.01)

(52) U.S. Cl.
USPC ............ 726/29; 713/150; 713/162; 713/176; 380/241; 705/50; 705/51; 709/203; 709/224

(58) Field of Classification Search
USPC ..................................................... 726/26, 29
See application file for complete search history.

(56) References Cited

U.S. PATENT DOCUMENTS

| | | | | |
|---|---|---|---|---|
| 5,301,320 | A | 4/1994 | McAtee et al. | |
| 6,151,583 | A | 11/2000 | Ohmura et al. | |
| 7,594,109 | B2 * | 9/2009 | Minne | 713/162 |
| 8,244,886 | B2 * | 8/2012 | Short et al. | 709/228 |
| 8,266,269 | B2 * | 9/2012 | Short et al. | 709/223 |
| 2003/0196093 | A1 * | 10/2003 | Raley et al. | 713/176 |
| 2004/0039627 | A1 | 2/2004 | Palms et al. | |
| 2004/0151315 | A1 * | 8/2004 | Kim | 380/241 |
| 2006/0041754 | A1 * | 2/2006 | Hind et al. | 713/176 |
| 2007/0083417 | A1 | 4/2007 | Wagner et al. | |
| 2007/0127667 | A1 | 6/2007 | Rachamadugu | |
| 2008/0005027 | A1 * | 1/2008 | Mullins | 705/51 |
| 2008/0059631 | A1 * | 3/2008 | Bergstrom et al. | 709/224 |
| 2008/0177994 | A1 * | 7/2008 | Mayer | 713/2 |
| 2009/0265789 | A1 * | 10/2009 | Risan et al. | 726/26 |
| 2010/0185306 | A1 * | 7/2010 | Rhoads | 700/94 |
| 2011/0225417 | A1 * | 9/2011 | Maharajh et al. | 713/150 |

OTHER PUBLICATIONS

Requirements Engineering, Expectations Management, and the Two Cultures|http://greenbay.usc.edu/csci577/fall2009/site/coursenotes/ep/usccse98-518.pdf|Boehm et al.|1999|pp. 1-9.*

* cited by examiner

*Primary Examiner* — Mahfuzur Rahman
(74) *Attorney, Agent, or Firm* — Moser Taboada

(57) ABSTRACT

A method and apparatus for securing media asset distribution for a marketing process is described. In one embodiment, the method includes generating a dynamic security component for each media asset allocation to at least one receiver, wherein the dynamic security component verifies the at least one receiver upon login, coupling the dynamic security component to at least one file having a media asset and communicating a locator reference associated with the at least one file to the at least one receiver, wherein the locator reference is created using the dynamic security component.

12 Claims, 7 Drawing Sheets

200

METHOD AND APPARATUS FOR SECURING MEDIA ASSET DISTRIBUTION FOR A MARKETING PROCESS

BACKGROUND

1. Technical Field

Embodiments of the present disclosure generally relate to automated media marketing systems and, more particular, a method and apparatus for securing media asset distribution for a marketing process.

2. Description of the Related Art

Marketing processes involve a significant amount of communications between parties. Often, these communications include the exchange of multimedia content, such as audio and video data, for the purpose of promoting products or services to potential customers or business partners. The multimedia content can include copyrighted material that is valuable to the owners. In such instances, the multimedia content constitutes media assets whose distribution and access requires constant monitoring and control.

Media-centered industries, such as the music recording industry or the motion picture industry, market goods and services almost exclusively with sensitive media assets that cost time and money to produce. Marketing groups within these industries must be very carefully when using these media assets. For example, a new song by a music artist that has never been released can potentially generate a large sum of revenue from sales. Hence, this song has an intrinsic value because of the lack of public availability. If the song were inadvertently released or surreptitiously misappropriated and became publicly available, the song loses the potential revenue.

Current systems that aim to control the distribution of the media assets suffer from several shortcomings. First, these systems are unable to determine a source of a media asset misappropriation. In other words, these systems cannot identify the recipient who made the media asset public. Second, the current systems cannot verify the recipient requesting the media asset. Furthermore, the current systems are often third-party services that are inadequate for the needs of such media-centered industries.

Therefore, there is a need in the art for a method and apparatus for implement an internal system for securing media asset distribution.

SUMMARY

Various embodiments of the present disclosure generally comprise a method and apparatus for securing media asset distribution for a marketing process. In one embodiment, a computer implement method for securing media asset distribution for a marketing process includes generating a dynamic security component for each media asset allocation to at least one receiver, wherein the dynamic security component verifies the at least one receiver upon login, coupling the dynamic security component to at least one file having a media asset and communicating a locator reference associated with the at least one file to the at least one receiver, wherein the locator reference is created using the dynamic security component.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
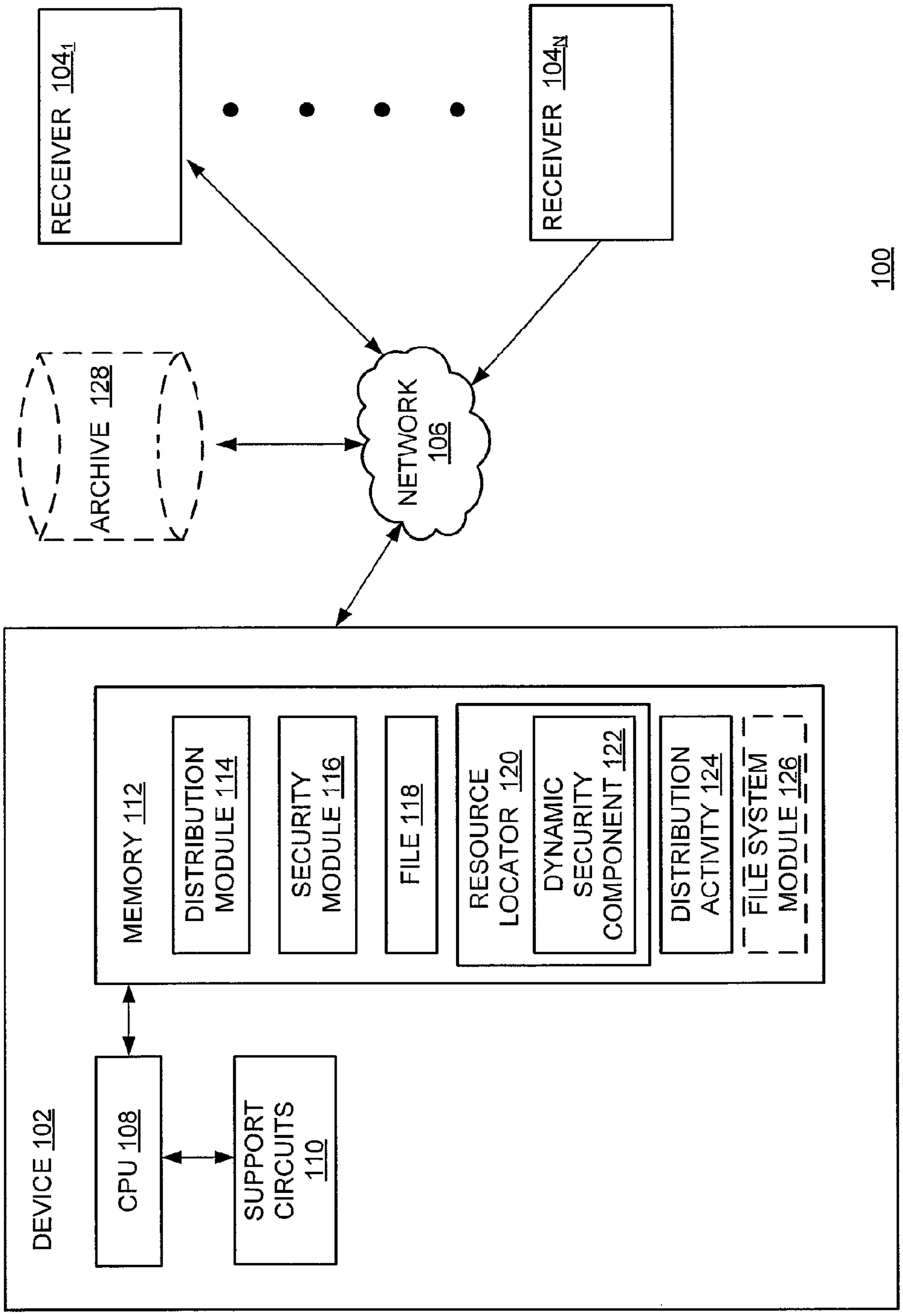
FIG. 1 is a block diagram of a system for securing media asset distribution for a marketing process according to one or more embodiments.

FIG. 1 is a block diagram of a system 100 for securing media asset distribution for a marketing process according to one or more embodiments. In some embodiments, the system 100 includes a device 102 and a plurality of receivers 104 that are coupled to each other through a network 106. The device 102 is a type of computing device (e.g., a laptop, a desktop, a server, a mobile device and/or the like) that comprises a Central Processing Unit (CPU) 108, support circuits 110 and a memory 112.

The CPU 108 comprises one or more commercially available microprocessors or microcontrollers that facilitate data processing and storage. The support circuits 110 facilitate operation of the CPU 108 and include clock circuits, buses, power supplies, input/output circuits and/or the like. The memory 112 includes a read only memory, random access memory, disk drive storage, optical storage, removable storage, and the like. The memory 112 further includes various software packages, such as a distribution module 114 and a security module 116, as well as various data, such as a plurality of files 118. Each of the plurality of files 118 includes media data 120 and a dynamic security component 122.

The distribution module 114 includes software code (e.g., processor executable instructions) for allocating the dynamic security component 122 to at least one of the plurality of receivers 104. It is appreciated that the plurality of receivers 104 represent computing devices used by contacts associated with the marketing process. In some embodiments, the distribution module 114 responds to file requests from the plurality of receivers 104 by permitting or denying access to media assets for marketing processes (e.g., promotional campaigns). The media assets include, but are not limited to, artwork, artist photos, audio data, video data, documents, contact lists, news resource locators, website resource locators (URLs), Rich Site Summary (RSS) feeds and/or the like. The security module 116 includes software code (e.g., processor executable instructions for generating the dynamic security component 122 for preventing unauthorized access to the file 118 as explained in detail further below.

In some embodiments, the dynamic security component 122 verifies any of the plurality of receivers 104, which may be performed upon login onto a secure media asset distribution system, as explained further below. For example, the dynamic security component 122 may include a digital signature, such as a unique key that is embedded within a resource locator (e.g., a URL). The resource locator is subsequently communicated to the specific receiver 104 (e.g., via e-card that is solicited using e-mail). Optionally, the dynamic security component 122 may also include a watermark, such as a unique payload or numeric sequence (i.e., serial number) that is embedded within a file associated with a specific media asset allocation. The watermark may also include an identifier for each file that is distributed for the specific media asset allocation.

The unique key is specifically generated for each specific media asset allocation for each one of the plurality of receivers 104. A new unique key is generated for each new media asset allocation. The unique key may be created by applying a cryptographic hash algorithm (e.g., Message-Digest algorithm 5 (MD5)) to various values, such as an address (e.g., an Internet Protocol (IP) address) of a server, a current time value, a random numeric value and/or the like. The server may include the device 102 and/or another computer associated distributing the secure media asset distribution system.

In some embodiments, the dynamic security component 122 is used to monitor (i.e., audit) distribution activity 124 associated with each media asset allocation. Because a unique key is associated with a specific media asset allocation, as explained in the paragraph above, the distribution module 114 monitors the distribution activity 124 for each file associated with the specific media asset allocation may be monitored. The distribution module 114 may also record information related to each file request, download and/or stream to any one of the plurality of receivers 104. For example, an address (e.g., an Internet Protocol (IP) address) of each receiver 104 that requests a file associated with the specific media asset allocation. The recorded information may be analyzed in the future for research purposes (e.g., research regarding popularity of a musical artist).

After each valid file request from the receivers 104, the distribution module 114 updates the distribution activity 124 for the file 118 to indicate a recent access. For example, the distribution activity 124 may indicate a time period (e.g., a number of days) since the file 118 has been successfully requested. Optionally, the distribution module 114 may instruct a file system module 126 to perform an archiving process on the file 118 based on the distribution activity 124. As explained in the description for FIG. 5, if the file 118 has not been accessed (i.e., inactive) after a pre-defined time period threshold, the file system module 126 stores the file 118 in a separate storage unit or database, such as an archive 128.

Figure 2:
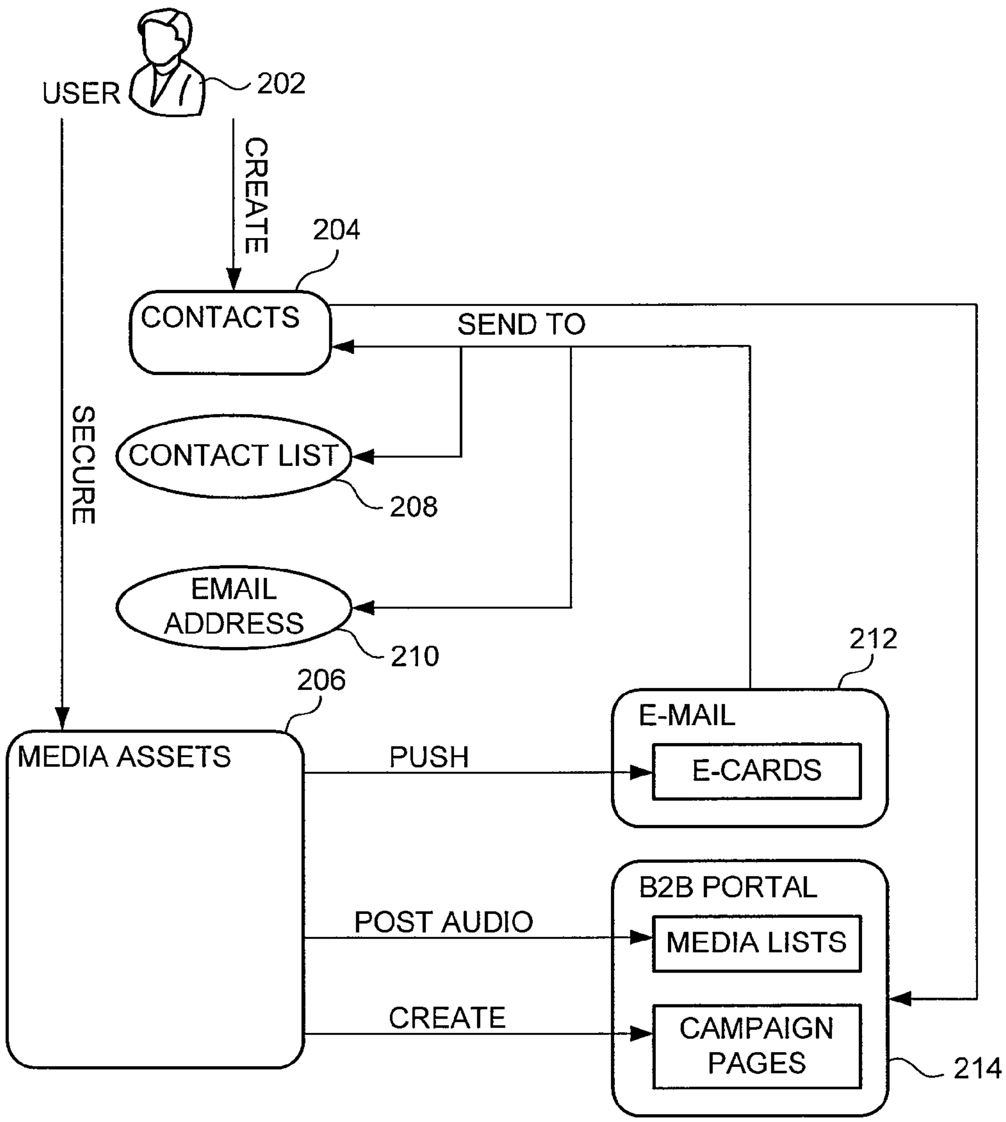
FIG. 2 is a functional block diagram illustrating secure media asset distribution according to one or more embodiments.

FIG. 2 is a functional block diagram illustrating secure media asset distribution 200 according to one or more embodiments. A user 202 with authority over a marketing process (e.g., a promotional campaign for a music artist) establishes contacts 204 for receiving copyrighted material in the form of media assets 206 (e.g., promotional material, such as audio files of songs, video files of music videos and/or the like). Using a contact list 208, the user 202 pushes the media assets 206 (e.g., audio, video, images, documents, HTML pages and/or the like) to the contacts 204 in the form of files (e.g., .mp3, .mov and/or the like). In some embodiments, a distribution module (e.g., the distribution module 114 of FIG. 1) transmits or streams the media assets 206 to computing devices associated with the contacts 204. As described further below, the media assets 206 are periodically archived based on distribution activity.

In some embodiments, the user 202 204 via a security module (e.g., the security module 116 of FIG. 1) controls distribution of the media assets 206 by generating a dynamic security component (e.g., the dynamic security component 122 of FIG. 1) for each allocation of a particular media asset of the media assets 206. For each contact 204, a new dynamic security component (e.g., a digital signature or key, a watermark and/or the like) is created for each one of the media assets 206 being distributed for the marketing process. In some embodiments, the user 202 communicates the new dynamic security component via e-mail 212, which is used at a later date to access the corresponding one of the media assets 206. Alternatively, the user 202 stores the corresponding one of the media assets 206 onto a portal 214 (e.g., a business-to-business (B2B) portal). For example, the user may post the corresponding one of the media assets 206 onto a media list of the portal 214 that is accessible through campaign pages associated with an artist being promoted. The user may be limited to certain operations by a set of permissions.

Figure 3:
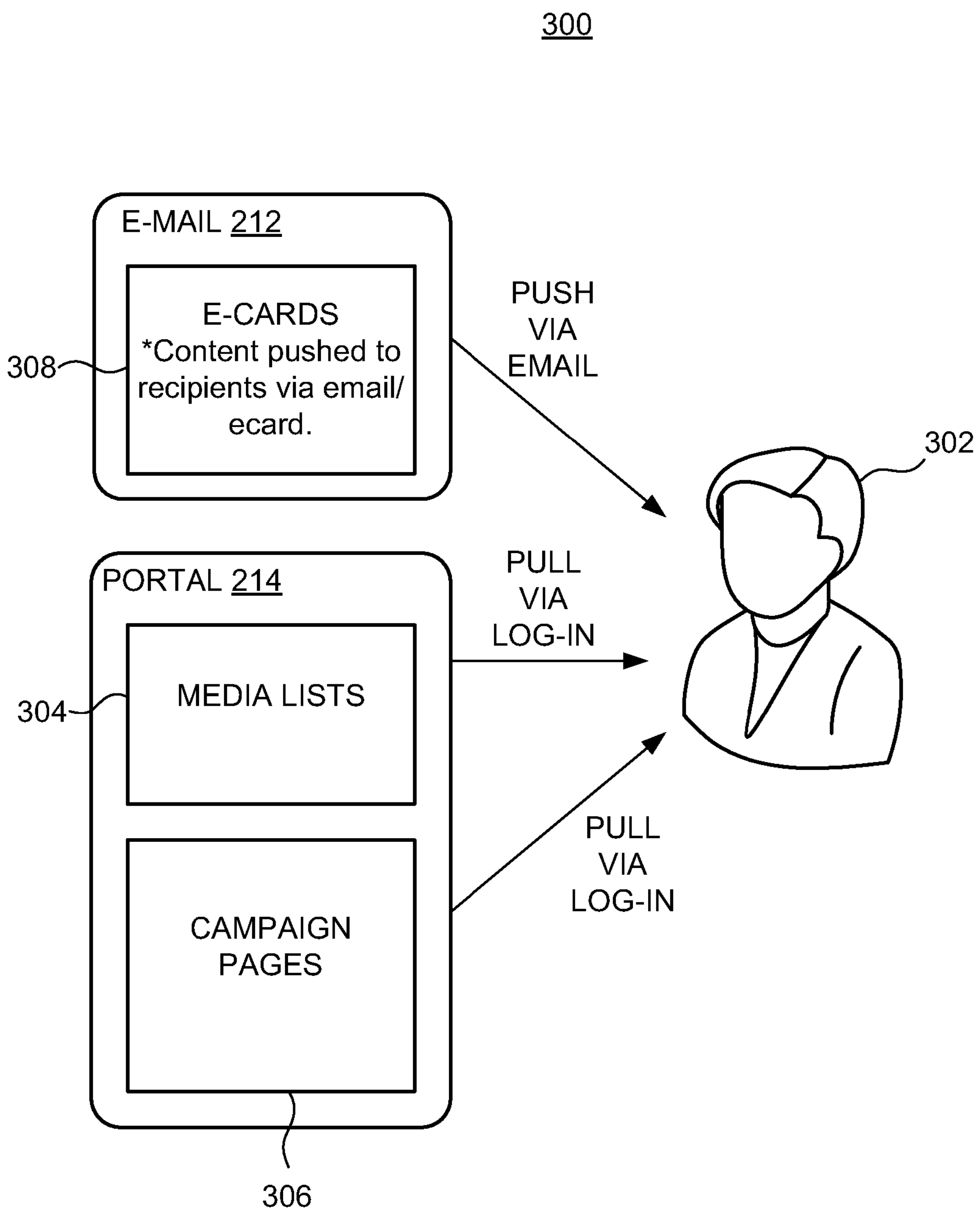
FIG. 3 illustrates a media distribution model according to one or more embodiments.

FIG. 3 illustrates a media distribution model 300 according to one or more embodiments. A recipient 302 includes a contact (e.g., recording industry representatives) established by a user (e.g., the user 202 of FIG. 2) of a system for securing media asset distribution during a marketing process. For example, the recipient may include a business partner (e.g., radio, marketing, publicity, sales, licensing and/or artists and repertoire (A&R) departments). In some embodiments, the user pushes a media asset to the recipient 302 via the e-cards 308. In some embodiments, one or more files comprising the media asset are transmitted to the recipients.

In some embodiments, the recipient 302 is emailed a dynamic security component embedded within a resource locator (e.g., a Universal Resource Locator (URL), such as a link to an Internet website). Once the recipient 302 activates the resource locator (e.g., by clicking the link), the recipient 302 is directed to a device (e.g., the device 102 of FIG. 1) that transmits the media asset to the recipient. Alternatively, the device may stream multimedia data (e.g., audio data) having the media asset without providing copies of the one or more files.

In other embodiments, the recipient 302 is emailed a resource locater through which the media asset is streamed to the recipient 302 without a dynamic security component. The recipient 302, on the other hand, may log into the portal 214 in order to access media lists 304 via campaign pages 306. The campaign pages 306 may include micro-websites having media-rich applications. The recipient 302 views the campaign pages 306 and decides whether to access and/or play streamed version of the media asset. Regardless of the distribution media method being employed, distribution activity associated with the media asset is still updated to reflect latest trends amongst the music industry as explained in detail further below.

Figure 4:
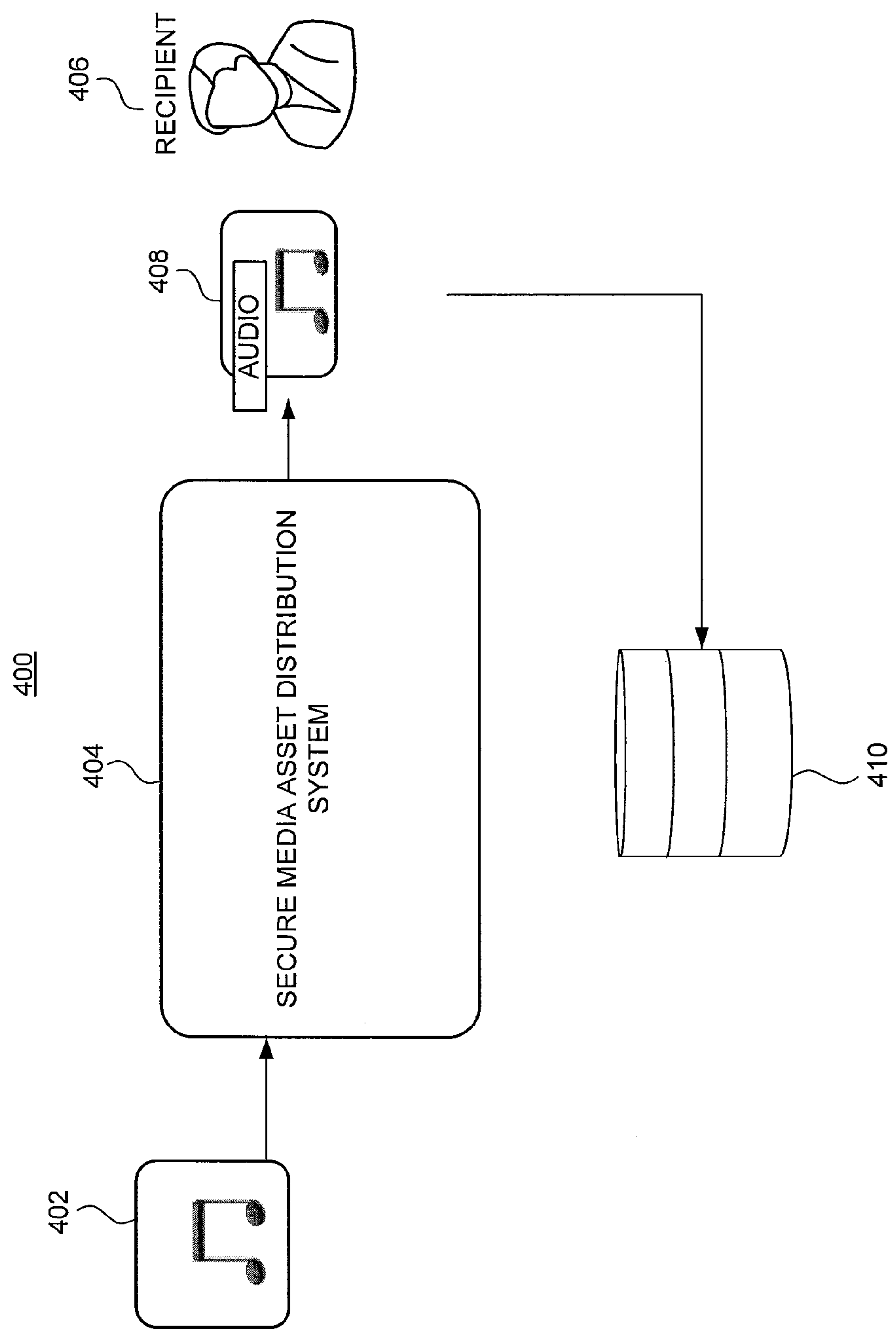
FIG. 4 is a functional block diagram illustrating a watermarking process according to one or more embodiments.

FIG. 4 is a functional block diagram illustrating a secure media asset distribution process 400 according to one or more embodiments. The secure media asset distribution process 400 involves a user who is directing a promotional campaign for a musical artist. Using a secure media asset distribution system 404, the user allocates the media asset 402 to a recipient 406 by embedding a dynamic security component into a file 408 that includes the media asset 402. Generally, the file 408 includes an encoding of audio data (i.e., digital audio signals). The audio data is arranged in a format (i.e., a codec), which may be converted from another format by the secure media asset distribution system 404.

In order to secure the media asset 402 and prevent unauthorized access to the audio data, the file 408 is coupled with the dynamic security component, such as a digital signature and/or a watermark. It is appreciated that the media asset 402 may be secured using both the watermark and the digital signature according to some embodiments. After registering the recipient 406, the digital signature and/or the watermark is stored in a database 410.

In some embodiments, the digital signature is embedded within a resource locater associated with a device for storing the file 408. The digital signature is used to verify the recipient 406 upon login at the secure media asset distribution system 404. If the digital signature provided within a file request from the recipient matches the digital signature associated with the media asset 402, the secure media asset distribution system 404 streams or transmits the file 408 to the recipient 406. The secure media asset distribution system 404 may provides a resource locator from which the file 408 may be downloaded or streamed. Whenever the recipient 406 downloads or streams the file 408 using the digital signature, the secure media asset distribution system 404 records such activity as distribution activity (e.g., the distribution activity 124 of FIG. 1) according to some embodiments. In some optional embodiments, if the distribution activity falls below a pre-defined threshold, the file 408 is archived.

Alternatively, the media asset 402 is secured using a watermark. In some embodiments, the watermark includes a unique payload that is embedded into the file 408. The watermark may be based on recipient 406 information, such as downloaded or streamed date. Whenever the recipient 406 downloads or streams the file 408, the secure media asset distribution system 404 records such activity as the distribution activity for the file 408. In addition, if the media asset is compromised because the file 408 is possessed by an unauthorized person, the secure media asset distribution system 404 may identify the intended recipient 406 based on the watermark.

Figure 5:
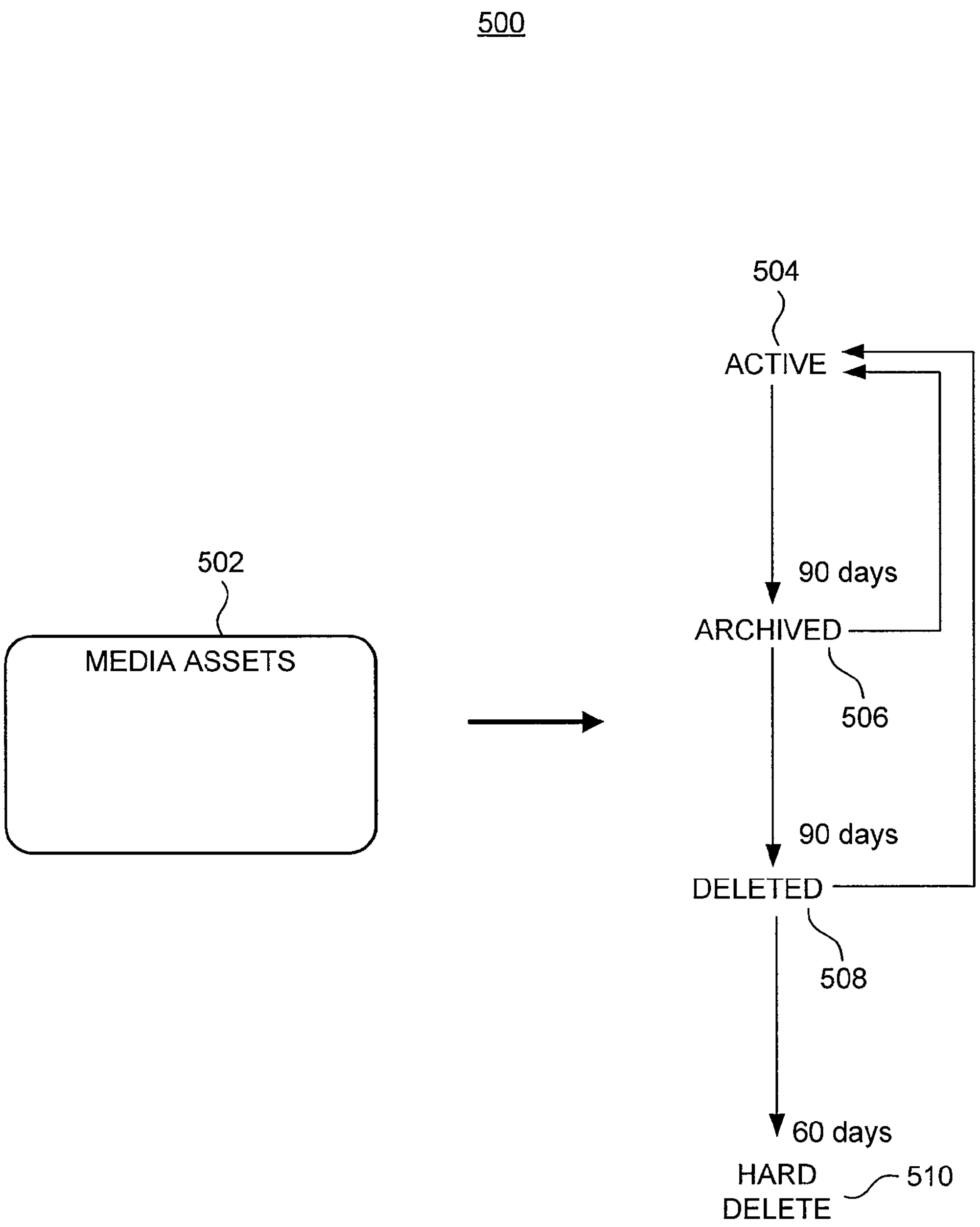
FIG. 5 is a functional block diagram illustrating an archiving process for a self-maintaining file system according to one or more embodiments.

FIG. 5 illustrates an archiving process 500 for a self-maintaining file system according to one or more embodiments. An archiving module (e.g., the archiving module 128 of FIG. 1) for a secure media asset distribution system (e.g., the device 102 of FIG. 1) may execute the archiving process 500. The self-maintaining file system organizes storage space for a plurality of files 502 for the purposes of reading and/or writing data to a particular file. The plurality of files 502 include media assets in various multimedia formats (e.g., .mp3, .may, .flv, .jpg, .mov, .tif and/or the like).

Based on various activity related to a media asset allocation, such as distribution activity (e.g., the distribution activity 124 of FIG. 1), the archiving process 500 may classify the plurality of files 502 into various archival states. In some embodiments, the archiving process 500 determines which of the various states corresponds with each of the plurality of files 502 in response to a current time period of inactivity, which starts after one or more contacts are notified via email. The current time period of inactivity resets after each request from an intended recipient. As explained further below, if the current time period of inactivity exceeds a certain pre-defined threshold time period of inactivity, the archiving process 500 modifies the corresponding state.

Once a particular file of the plurality of file 502 is uploaded to the secure media asset distribution system, the archiving process 500 designates the particular file to be in an active state 504 according to some embodiments. If, for example, a particular file has not been accessed for a pre-defined threshold number of days (e.g., ninety days), the archiving process 500 modifies the previous classification of active state and classifies the particular file as an archived state 506. In some embodiments, the archiving process 500 moves the particular file to an archive (e.g., the archive 128 of FIG. 1).

In some embodiments, the archiving process 500 determines that the current period of inactivity for the particular file exceeds another pre-defined threshold time period of inactivity. For example, the archiving process 500 may subsequently determine that the particular file has not been accessed for a number of days equal to the other pre-defined threshold time period (e.g., an additional 90 days for a total of one hundred and eighty days of inactivity) and reclassify the particular file into a deleted state 508. Accordingly, the particular file is marked for deletion. In some embodiments, the particular file may remain inactive for yet another pre-defined threshold time period of inactivity (e.g., an additional sixty days for a total of two hundred and forty days of inactivity) in which instance the archiving process adjusts the deleted state classification with a hard delete state 510. The archiving process subsequently deletes the particular file.

For example, the archiving process 500 monitors and records various activity associated with a media asset allocation for a current marketing process (i.e., campaign)), such as a number of times that a user views, edits and/or performs the media asset allocation to a receiver and/or a number of times a media asset is requested and/or communicated (e.g., downloaded or streamed). For each instance of any of these activities, the archiving process records a last accessed date. If a current time is greater than ninety (90) days from the last accessed date, the archiving process 500 automatically migrates the media asset allocation into an archived state 506 in which each and every file remains available for transmission and/or streaming, but no new media asset allocations are permitted for the current marketing process. In some embodiments, the archiving process migrates the entire current marketing process into the archived state 506. If the current time is greater than one hundred and eighty (180) days than the last accessed date, the archiving process 500 migrates the media asset allocation into the deleted state 508. After thirty (30) days in the deleted state 508, the archiving process 500 deletes each file, removes each dynamic security component (e.g., digital signature and/or watermark) and reclaims disk storage space.

Figure 6:
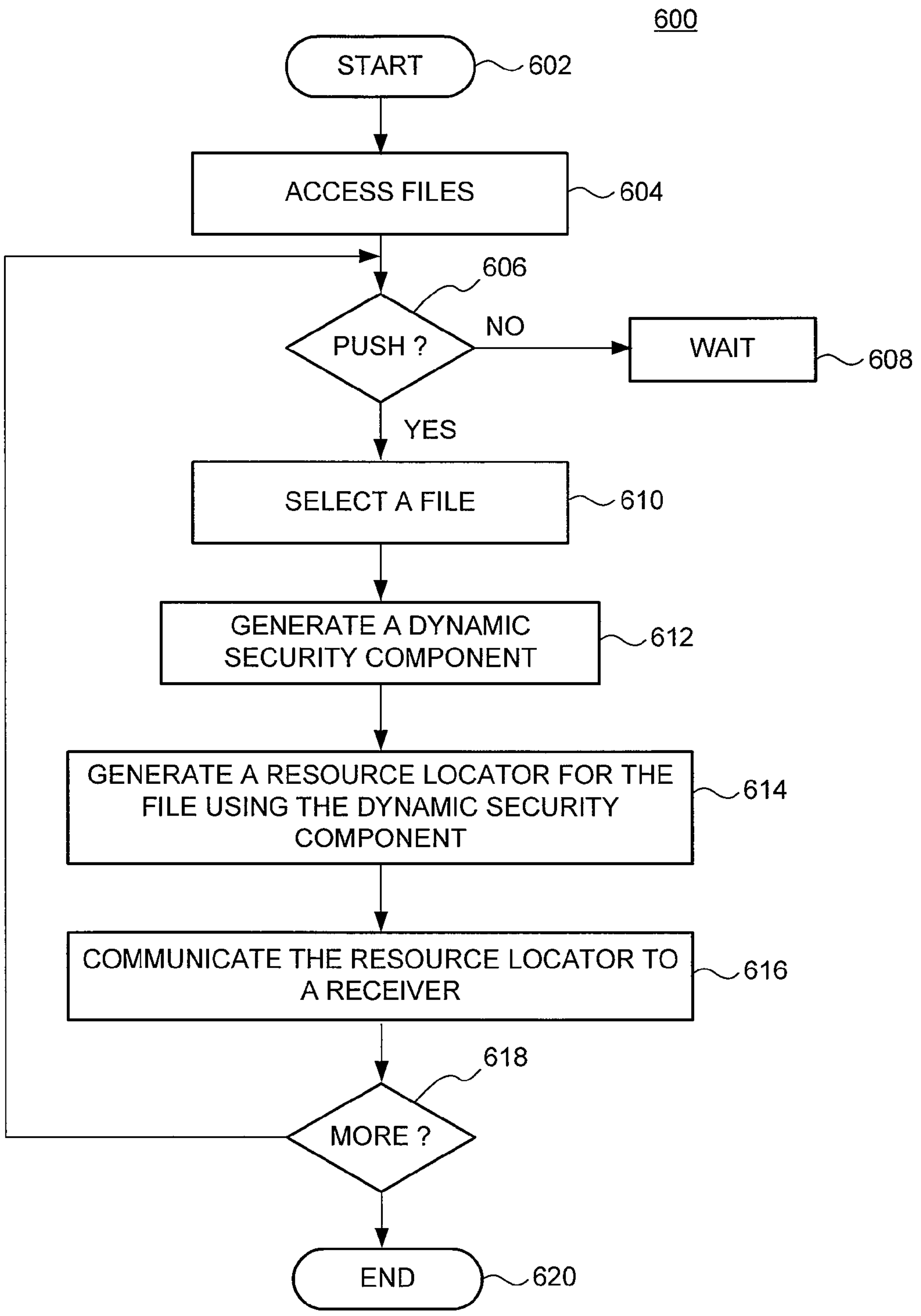
FIG. 6 is a flow diagram of a method for securing media asset distribution for a marketing process according to one or more embodiments.

FIG. 6 is a flow diagram of a method 600 for securing media asset distribution for a marketing process according to one or more embodiments. In some embodiments, a distribution module (e.g., the distribution module 114 of FIG. 1) performs each and every step of the method 600. In other embodiments, some steps are skipped or omitted. The method 600 starts at step 602 and proceeds to step 604.

At step 604, the method 600 accesses a plurality of files (e.g., the plurality of files 502 of FIG. 5). At step 606, the method 600 determines whether to push one or more of the plurality of files onto a contact that is an intended recipient. For example, when a marketing process (e.g., a promotional campaign for a musical artist) commences, the method 600 allocates a media asset for distribution to each and every intended recipient by facilitating the downloading (i.e., transmission) or streaming of the one or more files. If the method 600 decides not to push any of the plurality of files, the method 600 proceeds to step 608. At step 608, the method 600 waits. For example, the method 600 waits for a user to initiate the marketing process. If, on the other hand, the method 600 decides to push the one or more files, the method 600 proceeds to step 610.

At step 610, the method 600 selects a file (e.g., the file 118 of FIG. 1) amongst the plurality of files. At step 612, the method 600 generates a dynamic security component. In some embodiments, the method 600 instructs a security module to create the dynamic security component. Upon login to the secure media asset distribution system via the distribution module, the method 600 uses the dynamic security component to verify the intended receiver requesting the selected file. The method 600 couples the dynamic security component to the selected file having the allocated media asset. In some embodiments, if the dynamic security component includes a watermark (e.g., a unique payload), then the method 600 embeds the watermark into the selected file.

At step 614, the method 600 generates a resource locator for the file using the dynamic security component. At step 616, the method 500 communicates the resource locator to the intended receiver. If the intended recipient desires access to the media asset, the intended recipient must activate the URL in order to securely transmit or stream the selected file. If the dynamic security component includes a digital signature, the method 600 creates a Uniform Resource Locator (URL) comprising the digital signature, which is emailed to the intended recipient according to some embodiments. When the recipient communicates a request for the selected file, the URL having the digital signature is compared with a URL entered by the recipient and stored within the file request. As explained further below, if the digital signature coupled to the selected file matches data found within the file request, the selected file is transmitted and stored as a copy or is streamed to the receiver and played on a web application. If the digital signature does not match the file request, access to the selected file is denied.

At step 618, the method 600 determines whether to securely distribute the same file or a different file to another receiver (e.g., another contact for the promotional campaign). If the method 600 determines that there are no more files to distribute for the marketing process, the method 600 proceeds to step 620. If, on the other hand, the method 600 determines that there is at least one more intended recipient for the marketing process, the method 600 returns to step 606. At step 620, the method 600 ends.

Figure 7:
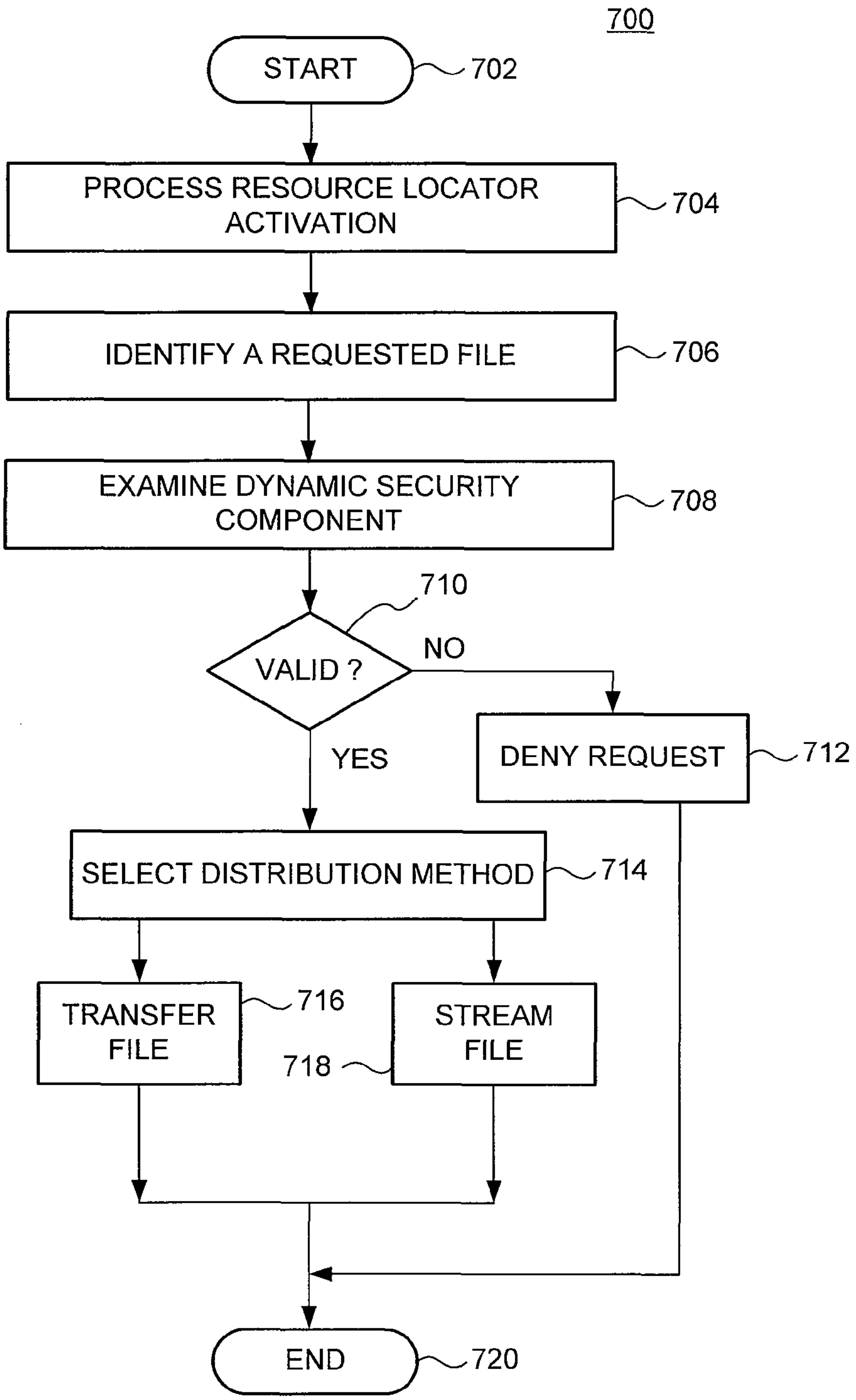
FIG. 7 is a flow diagram of a method for distributing media assets to one or more receivers according to one or more embodiments.

FIG. 7 is a flow diagram of a method 700 for distributing media assets to one or more receivers according to one or more embodiments. In some embodiments, a distribution module (e.g., the distribution module 114 of FIG. 1) performs each and every step of the method 700. As mentioned above, the distribution module forms a portion of a secure media asset distribution system (e.g., the secure media asset distribution system 404 of FIG. 4). In other embodiments, some steps are skipped or omitted. The method 700 starts at step 702 and proceeds to step 704.

At step 704, the method 700 processes resource locator activation by a recipient (e.g., the recipient 406 of FIG. 4). At step 706, the method 700 identifies a requested file based on the resource locator activation. The method 700 examines a file request and extracts data indicate a resource locator (e.g., a URL) used by the recipient to connect to the secure media asset distribution system via the Internet. Based on the extracted data, the method 700 determines a file name and/or location for the requested file (e.g., the file 118 of FIG. 1). At step 708, the method 700 examines a dynamic security component associated with the requested file. In some embodiments, the dynamic security component is embedded within a unique resource locator for allocation of a media asset (e.g., the media asset 402 of FIG. 4) to the recipient.

At step 710, the method 700 determines whether the file request is valid. The method 700 compares the resource locator found within the file request with the dynamic security component in order to verify the recipient. If the resource locator does not have the dynamic security component, the method 700 proceeds to step 712. At step 712, the method 700 denies the file request and proceeds to step 720. If, on the other hand, the resource locator comprises the dynamic security component, the method 700 proceeds to step 714. Because the resource locator comprising the dynamic security component also matches the unique resource locator that corresponds with a media asset allocation to the recipient, the file request is valid and the recipient is verified as an intended recipient.

At step 714, the method 700 selects a distribution method for the requested file. In some embodiments, the method 700 selects a first distribution method and proceeds to step 716. At step 716, the method 700 transfers the file as a complete copy to the recipient. For example, the method 700 may direct the recipient to an Internet resource (e.g., a web site) from where the requested file may be downloaded and stored locally at the recipient. The Internet resource may include a database (e.g., the archive 128 of FIG. 1) that stores the requested file. The method 700 may alternatively email a copy of the requested file to the recipient. In other embodiments, the method 700 selects a second distribution method and proceeds to step 718. At step 718, the method 700 streams the file to the recipient via the Internet resource. For example, a rich-content application residing on the recipient may play the file as it is being streamed.

After distributing the requested file via step 716 or step 718, the method 700 updates distribution activity (e.g., the distribution activity 124 of FIG. 1) to indicate the recent successful media asset allocation. In some embodiments, the method 700 resets a current period of inactivity associated with the requested file, which may result in a change of file system state. For example, the distribution module may instruct the file system module to reclassify the request file to an active state instead of an archived state, deleted state or hard delete state. At step 720, the method 700 ends.

While, the present invention is described in connection with the preferred embodiments of the various figures. It is to be understood that other similar embodiments may be used. Modifications/additions may be made to the described embodiments for performing the same function of the present invention without deviating therefore. Therefore, the present invention should not be limited to any single embodiment, but rather construed in breadth and scope in accordance with the recitation of the appended claims.

The invention claimed is:

1. A computer implemented method for securing media asset distribution for a marketing process, comprising:

generating, using a processor, a dynamic security component for each media asset allocation to at least one receiver, wherein the dynamic security component verifies the at least one receiver upon login at a secure distribution source for a media asset and the dynamic security component is used to monitor distribution activity associated with the each media asset allocation;

coupling the dynamic security component to at least one file having the media asset;

communicating a locator reference associated with the at least one file to the at least one receiver, wherein the locator reference is created using the dynamic security component; and updating, at the secure distribution source, distribution activity associated with the at least one file after processing at least one file request.

2. The method of claim 1 further comprising in response to a file request comprising the locator reference, performing at least one of transmitting or streaming the at least one file to a receiver of the at least one receiver.

3. The method of claim 1 further comprising archiving the at least one file based on a distribution activity.

4. The method of claim 1, wherein the dynamic security component comprises at least one of a digital signature or a watermark.

5. An apparatus for securing media asset distribution for a marketing process, comprising:

a security module for generating a dynamic security component for each file allocation to at least one receiver, wherein the dynamic security component verifies the at least one receiver upon login at a secure distribution source for a media asset and the dynamic security component is used to monitor distribution activity associated with the each media asset allocation and the security module is further configured for coupling the dynamic security component to at least one file having the media asset; and a distribution module for communicating a locator reference associated with the at least one file to the at least one receiver, wherein the locator reference is created using the dynamic security component, and the distribution module updates, at the secure distribution source, distribution activity associated with the at least one file after processing at least one file request.

6. The apparatus of claim 5, wherein the distribution module streams the at least one file to a receiver of the at least one receiver in response to a file request comprising the locator reference.

7. The apparatus of claim 5, wherein the distribution module examines a file request from a receiver of the at least one receiver and transmits the at least one file if the file request comprises the dynamic security component.

8. The apparatus of claim 5 further comprising a file system module for transferring the at least one file to an archive based on a distribution activity.

9. The apparatus of claim 5, wherein the dynamic security component comprises at least one of a dynamic signature or a watermark.

10. A non-transitory computer readable storage medium comprising one or more processor executable instructions that, when executed by at least one processor, causes the at least one processor to perform a method comprising:

generating a dynamic security component for each file allocation to at least one receiver, wherein the dynamic security component verifies the at least one receiver upon login at a secure distribution source for a media asset and the dynamic security component is used to monitor distribution activity associated with the each media asset allocation;

coupling the dynamic security component to at least one file having the media asset;

communicating a locator reference associated with the at least one file to the at least one receiver, wherein the locator reference is created using the dynamic security component; and updating, at the secure distribution source, distribution activity associated with the at least one file after processing at least one file request.

11. The computer-readable-storage medium of claim 10, wherein the one or more processor executable instructions perform the method further comprising in response to a file request comprising the locator reference, performing at least one of transmitting or streaming the at least one file to a receiver of the at least one receiver.

12. The computer-readable-storage medium of claim 10, wherein the one or more processor executable instructions perform the method further comprising archiving the at least one file based on a distribution activity.

* * * * *

UNITED STATES PATENT AND TRADEMARK OFFICE

CERTIFICATE OF CORRECTION

PATENT NO. : 8,650,659 B2
APPLICATION NO. : 13/038837
DATED : February 11, 2014
INVENTOR(S) : Capasso et al.

It is certified that error appears in the above-identified patent and that said Letters Patent is hereby corrected as shown below:

TITLE PAGE: ITEM (73) SHOULD READ

Assignees:

Sony Corporation; Tokyo, Japan

Sony Music Entertainment; New York, New York

Signed and Sealed this
Sixteenth Day of December, 2014

Michelle K. Lee

Michelle K. Lee
*Deputy Director of the United States Patent and Trademark Office*